United States Patent
Schwarz et al.

(10) Patent No.: US 10,830,145 B2
(45) Date of Patent: Nov. 10, 2020

(54) INTERCOOLED COOLING AIR FLEET MANAGEMENT SYSTEM

(71) Applicant: United Technologies Corporation, Farmington, CT (US)

(72) Inventors: Frederick M. Schwarz, Glastonbury, CT (US); Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 281 days.

(21) Appl. No.: 15/956,884

(22) Filed: Apr. 19, 2018

(65) Prior Publication Data

US 2019/0323430 A1 Oct. 24, 2019

(51) Int. Cl.
| | |
|---|---|
| *F02C 7/18* | (2006.01) |
| *F01D 5/08* | (2006.01) |
| *F01D 5/18* | (2006.01) |
| *F01D 25/12* | (2006.01) |

(52) U.S. Cl.
CPC ............. *F02C 7/18* (2013.01); *F01D 5/087* (2013.01); *F01D 5/187* (2013.01); *F01D 25/12* (2013.01); *F05D 2260/201* (2013.01); *F05D 2260/211* (2013.01); *F05D 2260/213* (2013.01)

(58) Field of Classification Search
CPC ...... F02C 6/08; F02C 7/12; F02C 7/18; F02C 7/185; F02C 9/18; F02C 9/24; F01D 25/08; F01D 25/12; F05D 2260/213
See application file for complete search history.

(56) References Cited

U.S. PATENT DOCUMENTS

| | | | |
|---|---|---|---|
| 2,692,476 A | 10/1954 | Schaal et al. | |
| 3,034,298 A | 5/1962 | White | |
| 3,610,698 A | 10/1971 | Gachot | |
| 3,878,677 A | 4/1975 | Colvin | |
| 4,254,618 A | 3/1981 | Elovic | |
| 4,304,093 A | 12/1981 | Schulze | |
| 4,539,945 A | 9/1985 | Bosisio | |
| 4,882,902 A | 11/1989 | Reigel et al. | |
| 4,967,552 A | 11/1990 | Kumata et al. | |

(Continued)

FOREIGN PATENT DOCUMENTS

| | | |
|---|---|---|
| CN | 106917641 A | 7/2017 |
| DE | 2852057 | 6/1979 |

(Continued)

OTHER PUBLICATIONS

European Search Report for EP Application No. 19170148.1 dated Aug. 19, 2019.

(Continued)

*Primary Examiner* — Gerald L Sung
(74) *Attorney, Agent, or Firm* — Carlson, Gaskey & Olds, P.C.

(57) ABSTRACT

A method of modulating cooling of gas turbine engine components includes the steps of identifying an input indicative of a usage rate for at least a first gas turbine engine component of a plurality of gas turbine engine components. A cooling system is operated for at least the first gas turbine engine component. The cooling system is moved between a higher cooling potential mode and a lower cooling potential mode based on the identified rate. A gas turbine engine is also disclosed.

17 Claims, 4 Drawing Sheets

(56) References Cited

U.S. PATENT DOCUMENTS

| | | |
|---|---|---|
| 5,056,335 A | 10/1991 | Renninger et al. |
| 5,269,135 A | 12/1993 | Vermejan et al. |
| 5,305,616 A | 4/1994 | Coffinberry |
| 5,392,614 A | 2/1995 | Coffinberry |
| 5,414,992 A | 5/1995 | Glickstein |
| 5,452,573 A | 9/1995 | Glickstein et al. |
| 5,498,126 A | 3/1996 | Pighetti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 6,050,079 A | 4/2000 | Durgin et al. |
| 6,065,282 A | 5/2000 | Fukue et al. |
| 6,134,880 A | 10/2000 | Yoshinaka |
| 6,430,931 B1 | 8/2002 | Horner |
| 6,487,863 B1 | 12/2002 | Chen et al. |
| 6,612,114 B1 | 9/2003 | Klingels |
| 6,892,523 B2 | 5/2005 | Fetescu et al. |
| 7,237,386 B2 | 7/2007 | Hoffmann et al. |
| 7,246,484 B2 | 7/2007 | Giffin, III et al. |
| 7,284,377 B2 | 10/2007 | Joshi et al. |
| 7,306,424 B2 | 12/2007 | Romanov et al. |
| 7,334,412 B2 | 2/2008 | Tiemann |
| 7,347,637 B2 | 3/2008 | Kubo et al. |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seltzer et al. |
| 7,882,691 B2 | 2/2011 | Lemmers, Jr. et al. |
| 7,886,520 B2 | 2/2011 | Stretton et al. |
| 7,926,289 B2 | 4/2011 | Lee et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,350,398 B2 | 1/2013 | Butt |
| 8,397,487 B2 | 3/2013 | Sennoun et al. |
| 8,402,742 B2 | 3/2013 | Roberge et al. |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 | 12/2013 | Suciu et al. |
| 8,621,871 B2 | 1/2014 | McCune et al. |
| 8,712,739 B2 | 4/2014 | Jiang et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergman et al. |
| 9,234,481 B2 | 1/2016 | Suciu et al. |
| 9,243,563 B2 | 1/2016 | Lo |
| 9,255,492 B2 * | 2/2016 | Bacic ............... F01D 11/24 |
| 9,297,391 B2 | 3/2016 | Rued et al. |
| 9,422,063 B2 | 8/2016 | Diaz |
| 9,429,072 B2 | 8/2016 | Diaz et al. |
| 9,816,897 B2 | 11/2017 | Ziarno |
| 9,818,242 B2 | 11/2017 | Volponi et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2007/0022735 A1 | 2/2007 | Henry et al. |
| 2007/0213917 A1 | 9/2007 | Bruno et al. |
| 2007/0245738 A1 | 10/2007 | Stretton et al. |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0090096 A1 | 4/2009 | Sheridan |
| 2009/0145102 A1 | 6/2009 | Roberge et al. |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2010/0043396 A1 | 2/2010 | Coffinberry |
| 2010/0154434 A1 | 6/2010 | Kubota et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 | 10/2011 | Glahn et al. |
| 2012/0067055 A1 | 3/2012 | Held |
| 2012/0102915 A1 | 5/2012 | Baltas |
| 2012/0159961 A1 | 6/2012 | Krautheim et al. |
| 2012/0180509 A1 | 7/2012 | DeFrancesco |
| 2013/0036747 A1 | 2/2013 | Fuchs et al. |
| 2013/0067928 A1 | 3/2013 | Arias Chao et al. |
| 2013/0098059 A1 | 4/2013 | Suciu et al. |
| 2013/0145744 A1 | 6/2013 | Lo et al. |
| 2013/0145774 A1 | 6/2013 | Duong et al. |
| 2013/0186102 A1 | 7/2013 | Lo |
| 2013/0199156 A1 | 8/2013 | Ress, Jr. et al. |
| 2013/0239583 A1 | 9/2013 | Suciu et al. |
| 2013/0319002 A1 | 12/2013 | Sidelkovskiy et al. |
| 2014/0020506 A1 | 1/2014 | Duong |
| 2014/0137417 A1 | 5/2014 | Silberberg et al. |
| 2014/0196469 A1 | 7/2014 | Finney et al. |
| 2014/0208768 A1 | 7/2014 | Bacic |
| 2014/0230444 A1 | 8/2014 | Hao et al. |
| 2014/0250898 A1 | 9/2014 | Mackin et al. |
| 2014/0260326 A1 | 9/2014 | Schwarz et al. |
| 2014/0311157 A1 | 10/2014 | Laurello et al. |
| 2014/0341704 A1 | 11/2014 | Fletcher |
| 2014/0352315 A1 * | 12/2014 | Diaz ............... B64D 33/10 60/772 |
| 2015/0114611 A1 | 4/2015 | Morris et al. |
| 2015/0285147 A1 | 10/2015 | Phillips et al. |
| 2015/0308339 A1 | 10/2015 | Forcier |
| 2015/0330236 A1 | 11/2015 | Beecroft et al. |
| 2015/0354465 A1 | 12/2015 | Suciu et al. |
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |
| 2016/0215732 A1 | 7/2016 | Malecki |
| 2016/0236790 A1 * | 8/2016 | Knapp ............... B64C 11/44 |
| 2016/0237906 A1 | 8/2016 | Suciu et al. |
| 2016/0312797 A1 | 10/2016 | Suciu et al. |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |
| 2017/0044980 A1 | 2/2017 | Duesler et al. |
| 2017/0044982 A1 | 2/2017 | Duesler et al. |
| 2017/0152765 A1 | 6/2017 | Uechi et al. |
| 2017/0159568 A1 | 6/2017 | Sennoun et al. |
| 2017/0167388 A1 | 6/2017 | Merry et al. |
| 2017/0175632 A1 | 6/2017 | Hanrahan et al. |
| 2017/0184027 A1 | 6/2017 | Moniz et al. |
| 2017/0204787 A1 | 7/2017 | Duesler et al. |
| 2017/0234224 A1 * | 8/2017 | Adibhatla ......... G05B 23/0289 60/226.1 |

FOREIGN PATENT DOCUMENTS

| | | |
|---|---|---|
| EP | 0447886 | 9/1991 |
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2604825 A2 | 6/2013 |
| EP | 2733322 | 5/2014 |
| EP | 2865981 | 4/2015 |
| EP | 2942490 | 11/2015 |
| EP | 2960468 A1 | 12/2015 |
| EP | 3085923 | 10/2016 |
| EP | 3085924 | 10/2016 |

(56) References Cited

FOREIGN PATENT DOCUMENTS

| | | |
|---|---|---|
| EP | 3121411 | 1/2017 |
| EP | 3296543 A1 | 3/2018 |
| FR | 2851295 | 8/2004 |
| GB | 1244340 | 8/1971 |
| GB | 2152148 | 7/1985 |
| GB | 2536628 A | 9/2016 |
| JP | H1136889 | 2/1999 |
| RU | 2016115404 A | 10/2017 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for EP Application No. 19170209.1 dated Aug. 22, 2019.

* cited by examiner

INTERCOOLED COOLING AIR FLEET MANAGEMENT SYSTEM

BACKGROUND

This disclosure relates to a fleet management system using an intercooled cooling air system for a gas turbine engine which has enhanced cooling features.

Gas turbine engines are known and typically include a fan delivering air into a bypass duct as bypass air and into a compressor as core airflow. The air is compressed in the compressor and delivered into a combustor where it is mixed with fuel and ignited. Products of this combustion pass downstream over turbine rotors, driving them to rotate.

As known, the turbine section sees very high temperatures and, thus, it is desirable to provide cooling air to the turbine. In addition, one trend in modern gas turbine engines is to increase the pressures reached by the compressor section. This raises temperature challenges at different components in the compressor section and, in particular, the disk and hubs.

While cooling systems have been utilized for components in the compressor section and turbine section, the cooling potential for a particular engine has been provided in a relatively constant manner across all of the engines in an aircraft's fleet.

SUMMARY

In a featured embodiment, a method of modulating cooling of gas turbine engine components includes the steps of identifying an input indicative of a usage rate for at least a first gas turbine engine component of a plurality of gas turbine engine components. A cooling system is operated for at least the first gas turbine engine component. The cooling system is moved between a higher cooling potential mode and a lower cooling potential mode based on the identified rate.

In another embodiment according to the previous embodiment, an average usage rate for a plurality of gas turbine engine components is identified and monitored for a difference between the average usage rate for a plurality of gas turbine engine components. The usage rate for the at least a first gas turbine engine component the difference is used to control when the moving step occurs.

In another embodiment according to any of the previous embodiments, the usage rate is a maintenance condition of the at least a first gas turbine engine component.

In another embodiment according to any of the previous embodiments, a point of movement between the higher cooling potential mode and the lower potential cooling mode is changed if it is determined that the maintenance condition of the at least a first gas turbine engine component is showing deterioration.

In another embodiment according to any of the previous embodiments, the usage rate for the first gas turbine engine component is based upon a route that an aircraft associated with the gas turbine engine is flying.

In another embodiment according to any of the previous embodiments, the route is evaluated based upon environmental concerns.

In another embodiment according to any of the previous embodiments, the route is evaluated based upon a length of travel.

In another embodiment according to any of the previous embodiments, the route is evaluated based upon an average temperature along the route.

In another embodiment according to any of the previous embodiments, the usage rate is the design of the first gas turbine engine component.

In another embodiment according to any of the previous embodiments, the cooling system is moved from the higher cooling potential mode to the lower cooling potential mode once a set point is reached. The set point is selected based upon the usage rate for the first gas turbine engine component.

In another embodiment according to any of the previous embodiments, the set point is an altitude.

In another embodiment according to any of the previous embodiments, the set point is associated with the speed of rotation of the gas turbine engine.

In another embodiment according to any of the previous embodiments, a control for the cooling system receives a new plug when the set point is changed.

In another embodiment according to any of the previous embodiments, the set point is changed in a control remotely.

In another embodiment according to any of the previous embodiments, the at least one a first gas turbine component is monitored to provide said usage rate.

In another embodiment according to any of the previous embodiments, an environmental condition to which the first gas turbine engine component is exposed is monitored to identify the usage rate.

In another featured embodiment, a method of modulating cooling of gas turbine engine components includes the steps of identifying an average usage rate for a plurality of gas turbine engine components. An input is identified indicative of a usage rate for at least a first gas turbine engine component of the plurality of gas turbine engine components. A difference between said average usage rate and the usage rate for the at least a first gas turbine engine component is monitored. A cooling system is operated for at least the first gas turbine engine component. The cooling system is moved from a higher cooling potential move to the lower cooling potential mode once a set point is reached. The set point is selected based upon the difference.

In another featured embodiment, a gas turbine engine includes a cooling system for at least one rotating component of a plurality of rotating components including compressor and turbine rotors. The cooling system is selectively movable from a higher cooling potential mode to a lower cooling potential mode. A control moves the cooling system from the higher cooling potential mode to the lower cooling potential mode once a set point is reached. The set point based upon a condition experienced by the gas turbine engine.

In another embodiment according to any of the previous embodiments, the set point is an altitude.

In another embodiment according to any of the previous embodiments, the set point is associated with the speed of rotation of at least one of the plurality of rotating components.

These and other features may be best understood from the following drawings and specification.

DETAILED DESCRIPTION

Figure 1:
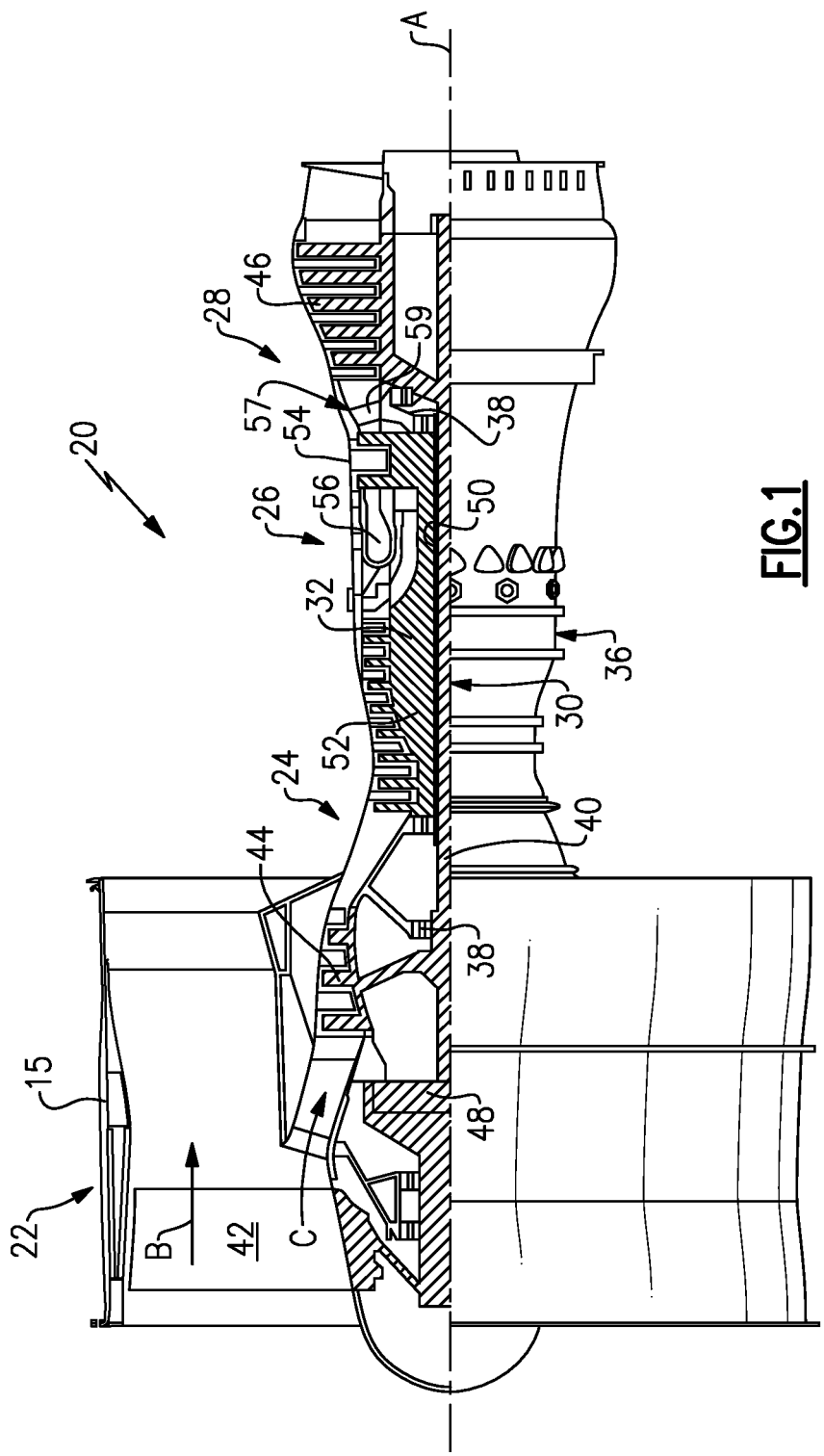
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Cooling air has been provided to components such as rotating components in the turbine and/or compressor section. However, the cooling potential of the system has been provided at a relatively constant level across all applications and challenges in an aircraft associated with the engine. One system for providing cooling air is disclosed with regard to FIGS. 2A-2C, 3 and 4. A powerful method and control scheme is disclosed with regard to FIGS. 5-7 for providing variable cooling potential based upon certain characteristics of the engine, as examples. While the method of FIGS. 2A-2C, 3 and 4 may be utilized, other cooling systems having the potential to provide varying cooling may also be utilized with the FIGS. 5-7 features.

Figure 2A:
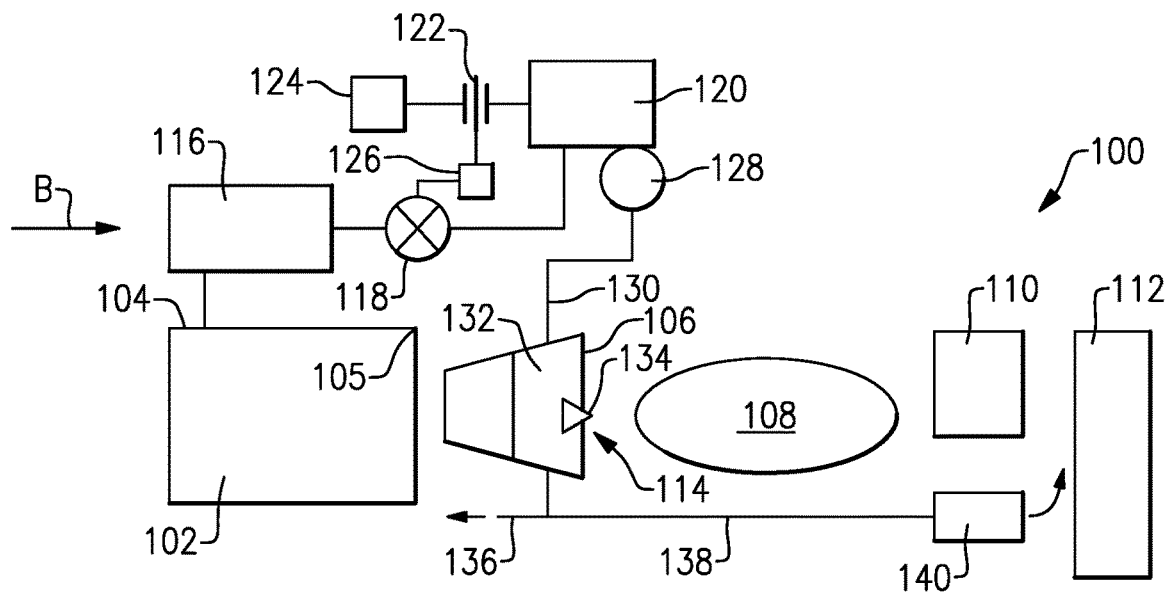
FIG. 2A shows an intercooled cooling system.

FIG. 2A shows a system 100 for providing cooling air to rotatable components, such as a rotor in the compressor section and/or blades in the turbine section.

As shown, the compressor section 102 has a tap 104 connected to tap compressed air for use as cooling air. In the FIG. 2A embodiment, the tap 104 is upstream of a downstream most location 105. By tapping air at the more upstream location, efficiencies are achieved by not utilizing air that has been compressed up to the final downstream position 105.

Modern gas turbine engines have increasing pressure and temperature challenges at both the downstream portions of the high pressure compressor and the upstream portions of the high pressure turbine. As such, the tapped air is passed through a heat exchanger 116, in which the tapped air is cooled, such as by bypass air B. Notably, the air could be cooled in locations other than the bypass duct and by fluid other than bypass air B. The air then passes downstream to a valve 118 and to a cooling compressor 120.

As shown, the cooling compressor is driven through a clutch 122 by a motor 124. A control 126 is operable to control the valve 118 and clutch 122. In particular, during high power operation, the cooling compressor 120 may be utilized to supply compressed cooling air, as will be described below. On the other hand, during lower power operation, say cruise and, idle, the air flow from cooling compressor 120 may be stopped. This can be achieved by opening the clutch 122 and closing the valve 118. Notably, it is desirable that the control 126 be operable to stop effective drive of the compressor 120 before the effective airflow to the compressor 120 is stopped by valve 118.

While a clutch 122 is shown, in other embodiments, the motor 124 may simply be stopped by the control 126. A diffuser 128 is positioned downstream of the cooling compressor 120. Air passes into a line 130 and then through a strut 132 in a compressor diffuser 106, which is downstream of the downstream most location 105. As known, there are actually a plurality of struts 132. As shown, the diffuser 106 is upstream of a combustor section 108, a first row turbine vane 110, and a first row turbine blade 112. The air in the struts 132 passes into optional lines 136 and/or 138. Line 136 extends to cool the disks and hubs of the downstream most row in a high pressure compressor. Line 138 may pass through a tangential on-board injector 140 (TOBI) and then to cool the blade 112 and vane 110. Notably, a chamber 114 is downstream of the point 105 and surrounds the compressor 108.

Figure 2B:
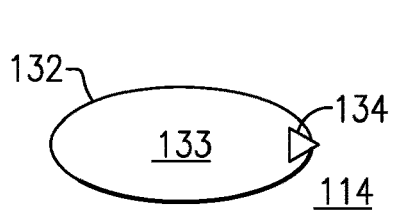
FIG. 2B is a cross section.

FIG. 2B shows the interior of the strut 132. As shown, an interior chamber 133 receives the air passing inwardly from line 130. A check valve 134 blocks flow of air from the chamber 114 as long as the pressure of the air at line 130 is higher than the pressure of the air in chamber 114.

In embodiments of this disclosure, the cooling compressor 120 is designed such that it compresses the air to a pressure significantly higher than the pressure downstream of the downstream point 105. The pressure at point 105 is typically known as $P_3$. The compressor 120 is designed to achieve 110%-130% of the $P_3$ pressure, with the $P_3$ pressure being defined at 86° F. sea level takeoff conditions. In one embodiment it achieves 120% of $P_3$. Thus, as long as the compressor 120 is delivering air into the strut 132, the valve 134 will remain closed.

The control 126 is typically programmed to maintain this airflow during takeoff, climb, and other relatively high power conditions.

Figure 2C:
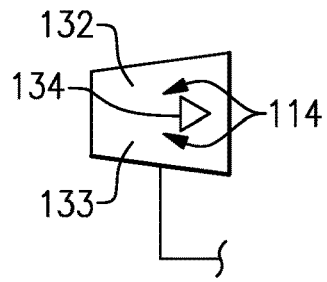
FIG. 2C shows the FIG. 2A system in a distinct operational condition.

On the other hand, as shown at FIG. 2C, during lower power conditions, such as idle or cruise, the control 126 stops flow of the compressed air from the compressor 120. Under such conditions, the valve 134 opens due to the higher pressure in chamber 114. The air passing into chamber 133 is now air which has not been compressed by the cooling compressor 120, but rather the air at pressure $P_3$.

This provides efficiencies, in that the cooling compressor 120 is not utilized when not needed.

Figure 3:
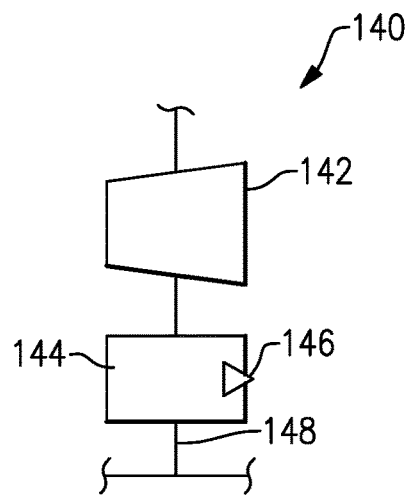
FIG. 3 shows another embodiment.

FIG. 3 shows another embodiment wherein the strut 142 is not the location of where the alternate flow of the air from chamber 114 or the cooling compressor occurs. Rather, there is a chamber 144 located away from the strut 142 which has the check valves 146. This embodiment would otherwise operate as the FIG. 2A/2B embodiment.

It should be understood that there would be a plurality of the struts 132 and a plurality of the struts would receive check valves 134.

The chamber 144 may be a single chamber having a plurality of check valves 146, or could be a plurality of discrete chambers.

At any rate, by utilizing a cooling compressor 120, which compresses the air significantly above $P_3$, economies are achieved with a number of features.

Figure 4:
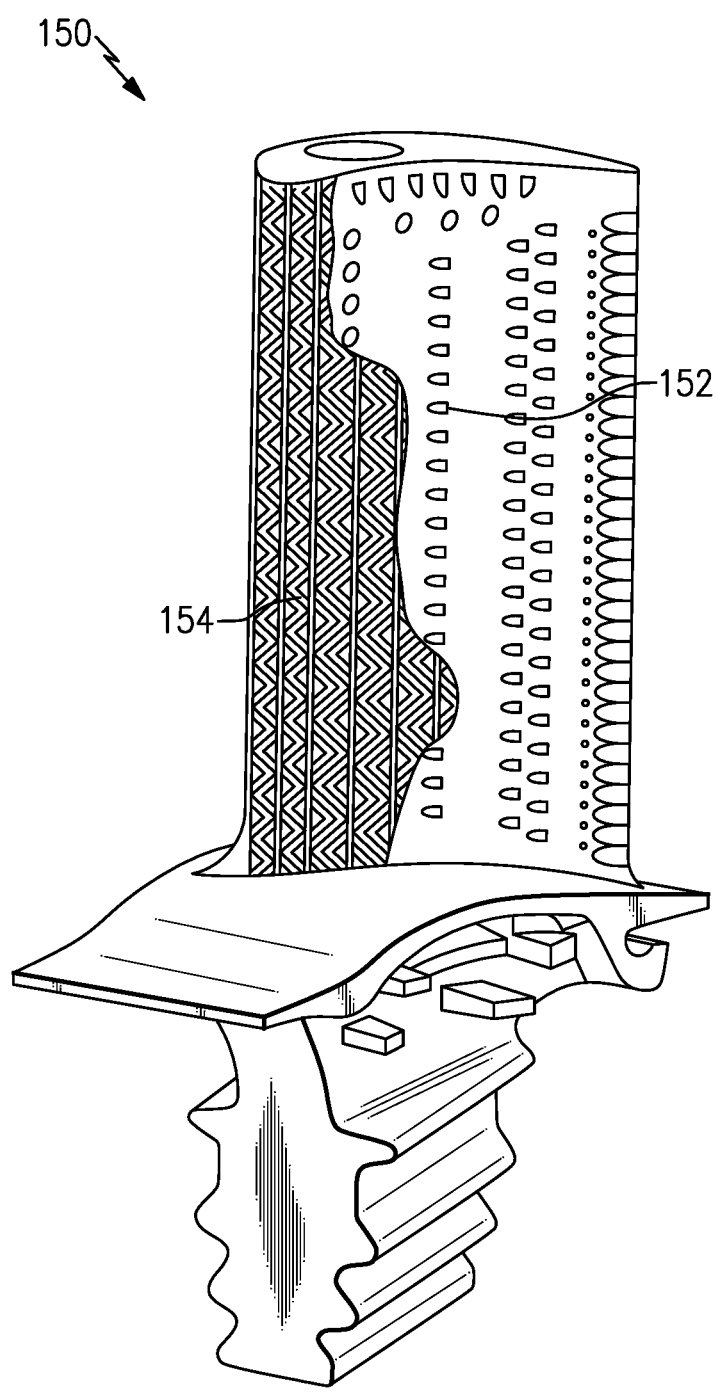
FIG. 4 shows features of a turbine blade.

FIG. 4 is an example of a turbine blade 150. As known, turbine blade 150 has skin cooling holes, such as shown at 152, and internal cooling channels with heat transfer elements, such as trip strips, as shown at 154.

The turbine blade 150, in modern gas turbine engines, is designed such that it can handle the increasing temperatures and pressures. Thus, in modern gas turbine engine designs, the walls of the turbine blade may be thinner, the trip strips, number of passes, the size of the holes, and the spacing between the holes may all be controlled to increase the cooling potential of the cooling air passing through the turbine blade 150.

Since the design of the turbine blade 150 must be adequate to cool the turbine blade at the highest power conditions, a worker in this art has faced a design choice between increasing the cooling potential for the higher power conditions, and living with the efficiency losses from all of the additional cooling structures at lower power conditions. It should be understood that the typical features to increase cooling potential reduce the pressure loss across the turbine blade. Thus, a turbine blade designed for high cooling potential at high power operation would be undesirably inefficient at lower power operation as there is less resistance to flow and, a greater amount of cooling airflow at the lower power conditions.

However, given the cooling compressor 120 and its higher pressure operation at higher power conditions, the turbine blade 150 can be designed to have less cooling potential under the lower power conditions and at the $P_3$ pressure seen when the cooling compressor 120 is not delivering cooling airflow. The higher pressure at conditions where the cooling compressor 120 is delivering its higher pressure air is able to drive through an adequately cooled turbine blade even for a turbine blade having lesser cooling potential.

A worker of ordinary skill in this art would recognize that many other components may be more optimally designed given the power of this disclosure.

The system, as described above, may be said to have a "set point" at which the cooling compressor is stopped and the higher cooling potential is no longer utilized. While the above-mentioned set point change is specifically disclosed, it should be understood that the following features could apply to engines with different cooling systems, but wherein a greater cooling mode exists and one that can be turned to a lesser, but more efficient cooling mode.

Figure 5:
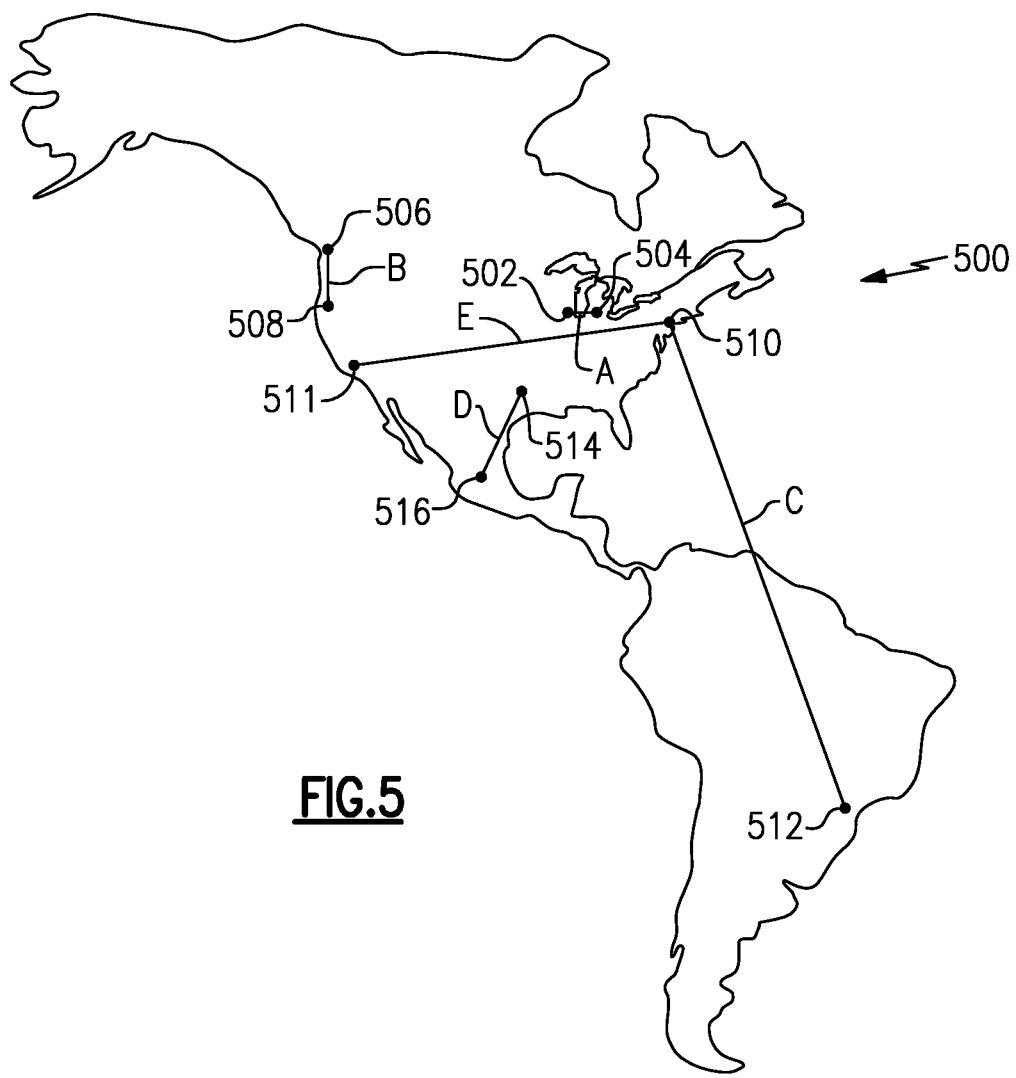
FIG. 5 schematically shows a map.

FIG. 5 shows a plurality of airplane routes on a map 500. 502 and 504 could be Chicago and Detroit. An aircraft that repeatedly flies this route is operating in a relatively cool climate. On the other hand, the shorter flight means that a greater percentage of the time, the aircraft is at the more stressful takeoff conditions compared to its time at cruise.

A flight B is also relatively short, and say from point 508 to point 506. Point 508 might be San Francisco and point 506 might be Vancouver. While an aircraft that repeatedly flies this flight may have similar challenges as the one repeatedly flying flight A, it may also experience environmental challenges. As an example, should Mt. St. Helen be somewhat active, there is the possibility that there could be volcanic dust in the atmosphere through which the plane flies.

Flight C is a relatively long flight from point 510 to point 512. Point 510 might be New York and point 512 could be Rio de Janeiro. A flight pattern D might be from points 514, Houston and point 516, Mexico City. Flights C and D are operating in higher temperature locations than flights A or B. The greater temperatures raise additional challenges on components in the engines repeatedly flying such routes.

Flight E from point 510 to point 511 is relatively long. Point 510 might be New York and 511 might be Los Angeles. The length of flights E and C do reduce the average stress on components as the engines will spend a greater amount of time at cruise relative to takeoff.

However, the longer flights are heavier aircraft and, thus, there are increased loads on the engine.

While a volcano is one example of an environment challenge, there are also areas of the world that have distinct environmental challenges. As an example, there are areas with heavy pollution, cement plants, etc.

As can be imagined, intercontinental flights are even longer, and carry a greater amount of time at cruise relative to time at takeoff relative to the smaller flights.

By setting a set point for changing between a higher cooling potential and a lower cooling potential for cooling rotating components in a gas turbine engine, an operator of aircraft operating the routes A-E can better tailor the cooling potential to the challenges the engines will face. As an example, the set point for turning off the cooling compressor for flight E might be lower than that for an aircraft repeatedly flying flight C. This is because flight C will tend to be through higher temperatures. The set point for flight B might be set to provide the greater cooling potential than that for the route A, and in view of the environmental challenges the aircraft repeatedly flying flight B might face.

Figure 6:
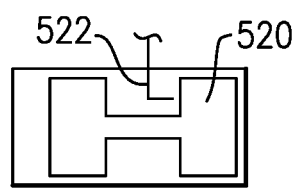
FIG. 6 shows a maintenance step.

FIG. 6 schematically shows the inspection of a turbine component 520 such as by a borescope 522. If emerging damage is identified with regard to other components on the turbine 520, then the set point might be changed for the engine to provide the higher cooling potential for a greater period of time. This measure is taken such that the emerging damage might not progress as quickly and force the engine to be removed prematurely and the engine section not be disassembled prematurely. In this way the management of the set point is used to match the life of the part with the emerging damage to that of the other hot section components making the inevitable overhaul cost more palatable.

In a similar way, if a fleet of say 1000 engines has a mixed bill of material in the hot section because an improved part was introduced to eliminate a known troubled part but that part is still in most of the engines, then all of the engines with the troubled part can have a more benign setting for the system and all of the improved parts can have a setting that saves fuel and runs the part hotter for longer. In this way, the overhaul shop visits can be evened out over time and be made more manageable.

A maintenance system could monitor the particular engine and see whether any components are heading toward needing replacement or repair prior to the next goal maintenance. As an example, an airline might have a goal of 4,000 flight hours between maintenance cycles. However, during routine inspection, one might see the component 520 it is approaching a condition where it might require replacement or repair before the next routine maintenance. In such a case, the set point of this engine can be changed such that the greater cooling potential is provided for a greater period of time during each flight. In this manner, the engine might be able to operate until the next scheduled routine maintenance.

Examples of set points that might be changed are the altitude at which the cooling compressor is turned off. As an example, a lower stress condition, or engines with "healthier" components, might have a set point at 15,000 feet while a higher stress engine, or one beginning to show some potential damage, might have its point set to 35,000 feet. Alternatively, the set point could be a speed of the engine, such as the high spool speed, typically known as N2. When the speed falls below its set point, the cooling system moves to the lower mode.

Another reason that an aircraft may change a selected set point for a particular engine could have to do with the components in the engine. As an example, some engines may have older components that have not been provided with certain engineering advancements that could be found in newer components. An engine with the older components may be indicated to have a higher set point.

Figure 7:
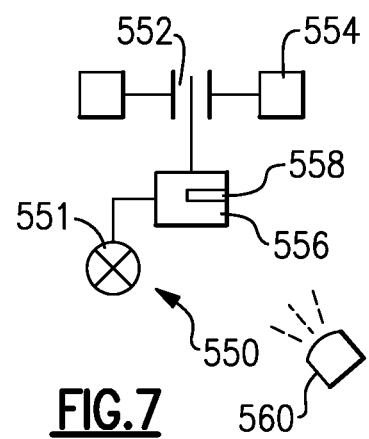
FIG. 7 shows a feature that can be incorporated into this disclosure.

FIG. 7 shows features of a system 550 and an associated control 556. Control 556 controls a shutoff valve 551 and a clutch 552 for a cooling compressor 554 as in the above embodiments. A data plug or control chip 558 may be entered into the control 556 to tailor, or change, the set point. This provides a simple method of changing the set point should conditions, such as the maintenance conditions described with regard to FIG. 6, suggest the change in the set point for a particular engine. The same would be true should there be a route change for a particular engine, as is described in FIG. 5.

Alternatively, a remote update such as shown schematically at 560 could communicate with a control 556.

The control 556 may be part of the full authority digital electronic controller (FADEC) or it could be a standalone controller.

As another alternative, an environmental challenge, or other condition, associated with a component could be monitored and used by a control to select when to change the cooling. This could be an aircraft mounted temperature sensor, or wireless received information, as examples.

A method according to this disclosure could be restated as operating a gas turbine engine on an aircraft by operating a cooling system for at least one rotating component of a plurality of rotating components including compressor and turbine rotors. Moving the cooling system from a higher cooling potential mode to a lower cooling potential mode once a set point is reached. The set point being selected based upon a condition experienced by the gas turbine engine.

A method according to this disclosure could also be restated as including the steps of identifying an input indicative of a usage amount for at least a first gas turbine engine component of a plurality of gas turbine engine components. A cooling system is operated for at least the first gas turbine engine component. The cooling system moves between a higher cooling potential mode and a lower cooling potential mode based on the identified rate.

A difference between an average usage amount for a plurality of gas turbine engine components and the usage amount for at least a first gas turbine engine component may also be monitored. The difference is used to control when the moving step occurs and identifies an average usage rate for a plurality of gas turbine engine components.

For purposes of understanding this method, the "identifying an average usage amount" step could be performed by a company who operates the gas turbine engine including the component by themselves monitoring usage amount for a plurality of gas turbine engine components to get to an average. Alternatively, they could "identify" the average usage amount simply by receiving it from another entity, such as the manufacture of the gas turbine engine component. The same is true for the step of "identifying a usage for the gas turbine engine component step.

Also, while specific examples speak of switching between two set points, of course a greater number may be used. For that matter, especially with monitoring, an infinite number may be used.

Although an embodiment of this invention has been disclosed, a worker of ordinary skill in this art would recognize that certain modifications would come within the scope of this disclosure. For that reason, the following claims should be studied to determine the true scope and content of this disclosure. For that reason, the following claims should be studied to determine the true scope and content of this disclosure.

The invention claimed is:

1. A method of modulating cooling of gas turbine engine components comprising the steps of:
    identifying an input indicative of an actual usage amount for at least a first gas turbine engine component of a plurality of gas turbine engine components;
    operating a cooling system for at least the first gas turbine engine component;
    moving said cooling system between a higher cooling potential mode and a lower cooling potential mode based on said actual usage amount; and
    a gas turbine engine having a main compressor section with a discharge point having a discharge pressure, with said lower cooling potential mode utilizing said discharge pressure, and said higher cooling potential mode being between 110% and 130% of the discharge pressure when the gas turbine is operating at takeoff conditions.

2. The method of modulating cooling as set forth in claim 1, further including the steps of identifying an average usage amount for a sample plurality of gas turbine engine components and monitoring for a difference between said average usage amount and said actual usage amount for at least the first gas turbine engine component, said difference being used to control when the moving step occurs.

3. The method of modulating cooling as set forth in claim 2, wherein the average usage amount is a maintenance condition of at least the first gas turbine engine component.

4. The method of modulating cooling as set forth in claim 3, wherein a point of movement between said higher cooling potential mode and said lower potential cooling mode is changed if a determination is made that the maintenance condition of at least the first gas turbine engine component is showing deterioration.

5. The method of modulating cooling as set forth in claim 1, wherein said actual usage amount for said first gas turbine engine component is based upon a route that an aircraft associated with the gas turbine engine incorporating the plurality of gas turbine engine components is flying.

6. The method of modulating cooling as set forth in claim 5, wherein the route is evaluated based upon environmental concerns.

7. The method of modulating cooling as set forth in claim 5, wherein the route is evaluated based upon a length of travel.

8. The method of modulating cooling as set forth in claim 5, wherein the route is evaluated based upon an average temperature along the route.

9. The method of modulating cooling as set forth in claim 1, wherein said actual usage amount is a design of the first gas turbine engine component.

10. The method of modulating cooling as set forth in claim 1, wherein the cooling system is moved from the higher cooling potential mode to the lower cooling potential mode once a set point is reached, and the set point is selected based upon said actual usage amount for said first gas turbine engine component.

11. The method of operating cooling as set forth in claim 10, wherein said set point is an altitude.

12. The method of modulating cooling as set forth in claim 10, wherein said set point is associated with a speed of rotation of the gas turbine engine incorporating the plurality of gas turbine engine components.

13. The method of modulating cooling as set forth in claim 10, further including a step of changing the set point, and a control for the cooling system receives a new plug when the set point is changed.

14. The method of modulating cooling as set forth in claim 10, further including a step of changing the set point, and said set point is changed in a control remotely.

15. The method of modulating cooling as set forth in claim 1 wherein, the first gas turbine component is monitored to provide said actual usage amount.

16. The method of modulating cooling as set forth in claim 15 wherein, an environmental condition to which said first gas turbine engine component is exposed is monitored to identify the actual usage amount.

17. A method of modulating cooling of gas turbine engine components comprising the steps of:
    identifying an average usage amount for a sample plurality of gas turbine engine components;
    identifying an input indicative of an actual usage amount for at least a first gas turbine engine component of the plurality of gas turbine engine components;
    monitoring for a difference between said average usage amount and said actual usage amount for at least the first gas turbine engine component;
    operating a cooling system for at least the first gas turbine engine component;
    moving the cooling system from a higher cooling potential mode to a lower cooling potential mode once a set point is reached, and the set point is selected based upon said difference; and
    a gas turbine engine having a main compressor section with a discharge point having a discharge pressure, with said lower cooling potential mode utilizing said discharge pressure, and said higher cooling potential mode being between 110% and 130% of the discharge pressure when the gas turbine engine is operating at takeoff condition.

\* \* \* \* \*